United States Patent [11] 3,594,855

| [72] | Inventor | Algimantas P. Urbutis Chicago, Ill. |
|---|---|---|
| [21] | Appl. No. | 719,567 |
| [22] | Filed | Apr. 8, 1968 |
| [45] | Patented | July 27, 1971 |
| [73] | Assignee | Union Carbide Corporation |

[54] METHOD AND APPRATUS FOR OBTAINING PREDETERMINED LENGTHS OF SHIRRED CASING
10 Claims, 3 Drawing Figs.

[52] U.S. Cl. .................................................. 17/42
[51] Int. Cl. ........................................... A22c 13/00
[50] Field of Search .................................... 17/42

[56] References Cited
UNITED STATES PATENTS

| 3,110,058 | 11/1963 | Marbach | 17/42 |
| 3,112,517 | 12/1963 | Ives | 17/42 |

FOREIGN PATENTS

| 209,932 | 12/1966 | Sweden | 17/42 |

Primary Examiner—Lucie H. Laudenslager
Attorneys—Paul A. Rose and John F. Hohmann ABSTRACT: A method and apparatus are provided for obtaining shirred casing sticks which contain predetermined, measured, equal lengths of tubular casing.

INVENTOR
ALGIMANTAS P. URBUTIS
BY John F. Hohmann
ATTORNEY

METHOD AND APPRATUS FOR OBTAINING PREDETERMINED LENGTHS OF SHIRRED CASING

This invention relates to a method and apparatus for obtaining predetermined, equal lengths of casing in shirred casing sticks. More particularly, this invention relates to a method and apparatus for measuring predetermined, equal lengths of casing to be contained in shirred casing sticks as continuous lengths of tubular casing are being continuously shirred.

Continuous lengths of tubular casings can be typically fabricated from such materials as cellulose, regenerated cellulose, polyolefins, collagen, alginates, starches and the like. These tubular casings are generally employed as food casings into which food items are stuffed and processed wherein the food casings serve as molds, containers and protective wrappings for the thusly stuffed and processed food items. In preparing these tubular food casings for subsequent handling and use by a food processor, continuous lengths of the tubular casings are typically shirred, compacted and then compressed to obtain relatively short, compact, rigid lengths of tubular casings commonly referred to by those skilled in the art as "shirred casing sticks." A typical method and apparatus which can be utilized to obtain shirred casing sticks is disclosed and described in U.S. Pat. No. 2,983,949 to Matecki.

For purposes of economy and efficiency, shirred casing sticks containing predetermined lengths of casing are made available to food processors since the food processors utilize different sizes of casing for stuffing and processing different food items therein. In some instances, obtaining shirred casing sticks which contain substantially equivalent lengths of tubular casing is difficult since the materials from which these tubular casings are fabricated exhibit a degree of porosity, springiness or resiliency rendering them extremely troublesome to regulate, control and measure as they are being continuously shirred.

For example, great difficulty has been encountered in attempting to provide uniform lengths of tubular casing in shirred casing sticks when the tubular casing is fabricated from collagen. As is known to those skilled in the art, collagen casings are delicate and porous and can be easily torn or ruptured during shirring unless handled with care. Consequently, collagen casings are dried, sized and shirred in an inflated state and are more loosely shirred than casings fabricated from other, more durable materials such as cellulose.

Tubular collagen casings are typically shirred in a continuous shirring operation which includes conveying a continuous length of tubular collagen casing through a conventional dryer-sizer unit before the tubular collagen casing is shirred. In order to properly dry and size the continuous length of tubular collagen casing as it is being conveyed through the dryer-sizer unit, it is maintained in an inflated state by means of a continuously flowing stream of air, supplied under closely controlled pressure, admitted into the tubular casing.

As is known to those skilled in the art, the density of shirred and compacted casings varies along their lengths. The term "density" as employed herein should be understood as and is intended to refer to the length of tubular casing contained between any two fixed points in a shirred and compacted length of casing. Due to this variation in density, it is difficult to obtain predetermined, equal lengths of tubular casing to be contained in a shirred casing stick by severing the casing after it has been shirred and compacted.

Collagen casings also exhibit a relatively high degree of springiness or resiliency. Hence, collagen casings are preferably shirred and compacted into relatively longer casing stick lengths before being severed and compressed in order to utilize this inherent springiness or resiliency. The longer collagen casing stick length thus acts as a cushion during shirring and compacting of the tubular collagen and serves to minimize the strains exerted on the delicate casing as it is pleated and then formed into shirred collagen casing sticks. These factors render obtaining uniform lengths of tubular collagen casings in subsequently formed shirred casing sticks quite difficult. It has been found, for example, that after 30 foot lengths of tubular collagen casing have been shirred but not compressed, they varied in length from about 13 to 19 inches.

Various methods of marking tubular casings, such as by the addition of colored and fluorescent markings, magnetic and electrically responsive sensing materials, vitamins, starches and the like, have been employed in efforts to obtain uniform lengths of tubular casing in shirred casing sticks. These methods have not been entirely successful since they either involve the addition of objectionable foreign matter to the casing or require manual manipulation for control.

It is an object of this invention, therefore, to provide a method and apparatus for automatically and accurately measuring predetermined, equal lengths of tubular casing to be contained in shirred casing sticks as continuous lengths of tubular casing are continuously being shirred.

This and other objects of the invention will be more fully comprehended from the ensuing discussion and description of the invention.

It has now been found that the objects of the invention can be attained by providing, in general, a method and apparatus which comprises, in combination, means for indexing an indicator at a first point in a continuous length of tubular casing as it is being continuously shirred; means for advancing the thusly indexed indicator as a subsequent, continuous length of casing is being continuously shirred; means for severing the shirred length of casing at the point where the indicator has been indexed; means for successively returning the indicator to be successively indexed at predetermined, measured points in subsequent, continuous lengths of casing as they are being shirred; and means for successively compressing each successively severed length of shirred casing to obtain shirred casing sticks each of which contains predetermined, measured equal lengths of tubular casing.

The method and apparatus of the invention will become more clear when considered together with the accompanying drawing which is set forth as being merely illustrative of the invention and is not intended to be limitative thereof and wherein.

Figure 1:
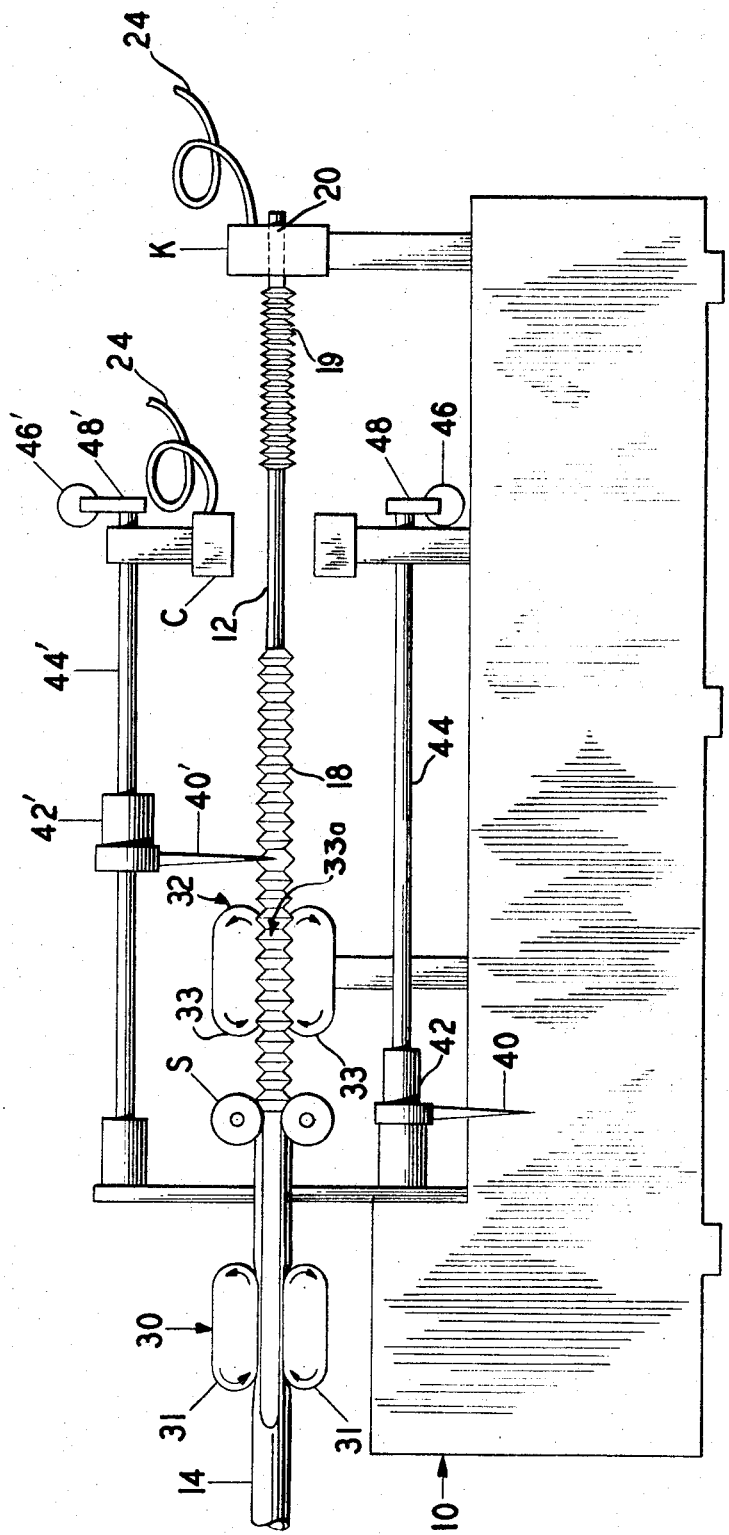
FIG. 1 is a schematic side elevational view, part in section, illustrating one embodiment of the apparatus of the invention and showing some of the components thereof in sequential, advanced operating positions.

Turning now to the drawing, wherein like reference numerals denote like parts, there is shown in FIG. 1 a shirring apparatus, generally designated by reference numeral 10, which can be the same as or similar to the shirring apparatus disclosed and described in U.S. Pats. Nos. 2,983,949 and 3,115,669 both to Matecki. Shirring apparatus 10 generally comprises a hollow mandrel 12 which is positioned and aligned by means of clamps C and K to be substantially central to a shirring means, denoted by letter S. As disclosed and described in the above-identified U.S. Patents to Matecki, the shirring means S consists of three cogged wheels axially positioned about hollow mandrel 12 which wheels serve to grip, pleat and advance successive portions of a continuous length of inflated tubular casing 14 along hollow mandrel 12. Clamps C and K are equipped with mating ports (not shown) which lead to the bore 20 of hollow mandrel 12 so that air can be admitted through the bore 20 of hollow mandrel 12 by means of flexible conduits 24 which connect clamps C and K to a source of air (not shown). As pointed out hereinabove, the air admitted through the bore 20 of hollow mandrel 12 is utilized to inflate a continuous length of tubular casing 14 as it is conveyed through a dryer-sizer unit (not shown) and advanced therefrom to be shirred.

A means 30, comprising a pair of rotatably driven belts 31 which are driven in the direction shown by the arrows, is positioned forward of the shirring means S to engage a continuous length of inflated tubular casing 14 and advance it over and about the hollow mandrel 12 to the shirring means S. A holdback means or compacting means, generally denoted by reference numeral 32, is positioned aft of the shirring means S and acts in cooperation with the shirring means S to compact the pleats formed in a length of tubular casing 18 and nest them closely adjacent to each other.

As has been pointed out hereinabove, tubular collagen casing is delicate and can be readily torn or ruptured. Hence, tubular collagen casing is preferably shirred and compacted to provide a relatively loosely compacted length of shirred collagen casing. When shirring tubular collagen casing, therefore, a holdback means should be employed which will exert a force sufficient to continuously retard the advance of a length of collagen casing as it leaves the shirring means S and loosely compact it. In a preferred embodiment of the invention, the holdback means or compacting means 32 also comprises a pair of resilient elements such as rotatably driven belts 33 which are positioned aft of the shirring means S to axially engage a length of tubular casing 18 with sufficient force to loosely compact the pleats formed therein by the shirring means S and nest them relatively close to each other. To accomplish this, the belts 33 comprising the holdback means 32 are rotated in the direction shown by the arrows at a speed which will impart a continuous retarding force to the tubular casing 18 as it is advanced over and along hollow mandrel 12.

Use of a holdback means 32 comprising a pair of rotatably driven belts 33 is particularly significant since there is thereby provided not only a continuous retarding force to the casing being shirred but also a passage therebetween shown as 33a through which a pair of indicators 40 and 40' can be conveyed without interruption.

Figure 2:
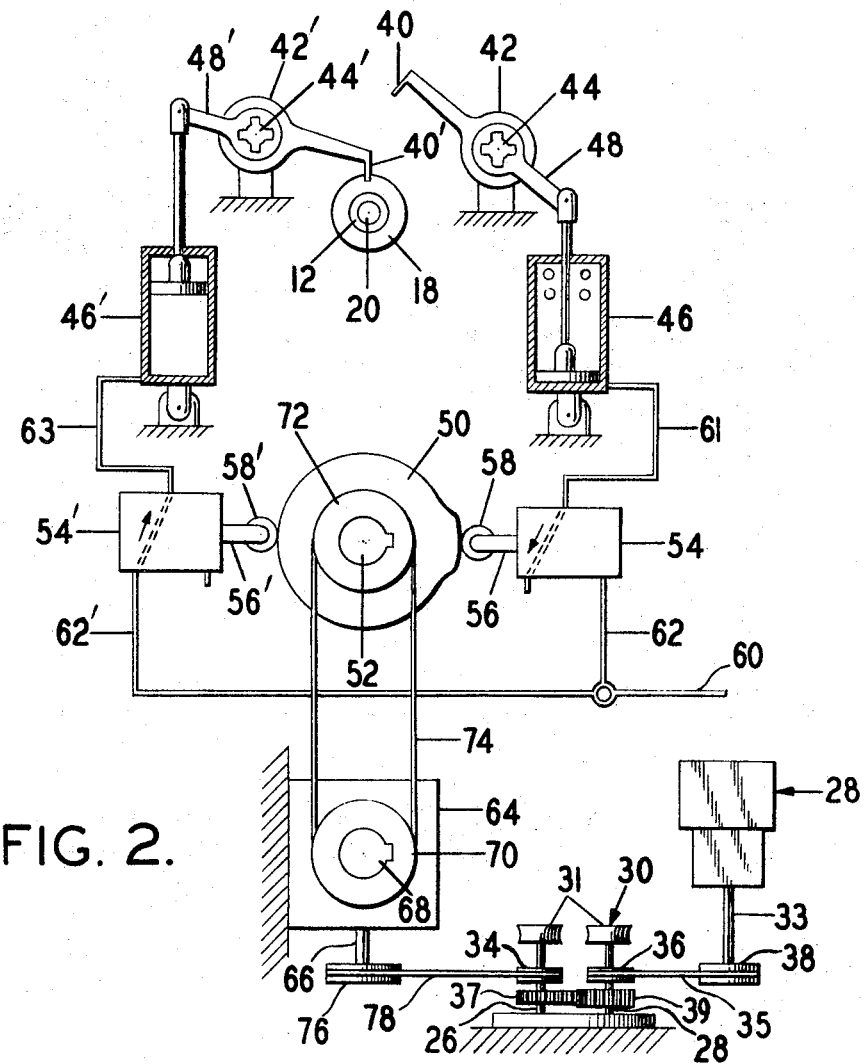
FIG. 2 is a schematic end elevational view, part in section, illustrating the operating components of the indicator means of the apparatus of FIG. 1; and, FIG. 3 is an exaggerated, schematic, side elevational view of a portion of the shirring means of the apparatus of FIG. 1.

As shown in FIGS. 1 and 2, the pair of indicators 40 and 40' are each respectively secured to a slide carriage 42 and 42'. Slide carriages 42 and 42' are, in turn, each respectively slideably mounted on rotatable, splined guide rods 44 and 44'. Splined guide rods 44 and 44' and/or slide carriages 42 and 42' can be fabricated from a material, such as nylon, or coated with a material, such as silicone, so that only a minimal amount of friction is created between their operating surfaces during operation.

Operating friction between splined guide rods 44, 44' and slide carriages 42, 42' can also be minimized by utilizing ball splines since rolling friction is substantially less than sliding friction. Splined guide rods 44 and 44' are rotated by means of spring return air cylinders 46 and 46', respectively, which are in turn, connected to pivotably secured crank arms 48, 48', respectively.

Indicators 40 and 40' are preferably tapered so that their free ends can be easily and readily positioned between adjacent pleats formed in a shirred length of tubular casing 18.

In FIG. 1, reference numeral 19 denotes a severed, predetermined length of shirred and compacted casing advanced on the hollow mandrel 12 to be subsequently compressed to form a shirred casing stick.

Although not critical, the splined guide rods 44 and 44' are preferably mounted so that they are positioned opposite each other and parallel to the longitudinal axis of the hollow mandrel 12. In order to insure efficient and effective operation of the apparatus of the invention, the leading ends of splined guide rods 44, 44' should each be positioned about opposite the center of the shirring means S and extend therefrom a distance sufficient to accommodate the longest predetermined, measured length of shirred casing.

In FIG. 2 there is illustrated one means by which indicators 40, 40' can be actuated. As shown therein a cam 50 is mounted on a shaft 52 and positioned to actuate conventional, spring loaded three-way air valves 54 and 54'. When employing two indicators 40 and 40', the three-way air valves 54 and 54' should each be positioned at 180° with respect to each other and on a common axis perpendicular to and passing through the centerline of shaft 52. Each three-way air valve 54, 54', is equipped with a spool 56, 56', respectively, having a roller 58, 58' respectively mounted to the free end of each spool 56, 56'. The three-way air valves, 54, 54' are each aligned so that rollers 58, 58' are in contact with the surface of cam 50 so that spools 56, 56' can be actuated by cam 50 to ride in and out of their respective three-way valves 54, 54' and connect an intake port in either spring return air cylinder or close the intake port of either cylinder thereby exhausting either spring return air cylinder through three-way valves 54, 54'. Air is supplied to three-way air valves 54, 54' from a suitable source (not shown) by means of air lines 60, 62 and 62'. Air lines 61 and 63 link three-way air valves 54, 54' respectively with spring return air cylinders 46, 46'.

Opposite cam 50 there is positioned a gear box 64 having an input shaft 66 and an output shaft 68 connected thereto. Mounted on output shaft 68 is a sheave 70. Another sheave 72 is also mounted to the shaft 52 of cam 50 and an endless belt 74 is trained between and about sheaves 70 and 72. A third sheave 76 is connected to input shaft 66 and is connected to one sheave 34 mounted on shaft 26 of the feed means 30 by means of endless belt 78. A second sheave 36 of feed means 30 is mounted on shaft 28 and is connected to a drive sheave 38 by means of an endless belt 35 trained between and about sheaves 36 and 38. Drive sheave 38 is mounted to drive shaft 33 which, in turn, is connected to a suitable drive means such as an electric motor generally indicated by reference numeral 28. Power is transmitted from sheave 36 to sheave 34 of feed means 39 by means of meshing gears 37 and 39 which are mounted on shafts 26 and 28, respectively.

Figure 3:
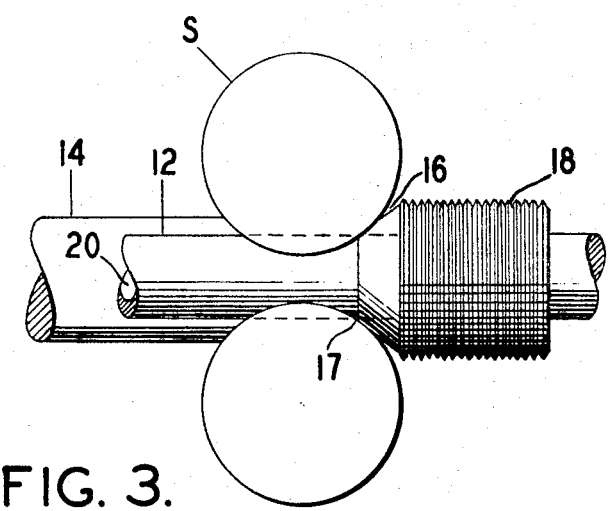

Turning now to FIG. 3, there is shown therein a continuous length of inflated tubular casing 14 positioned along and about hollow mandrel 12 and in engagement with the shirring means S. Emerging from shirring means S there is shown a continuous length of shirred casing 18. Reference numeral 17 denotes the general area or locus in which pleats are formed in a continuous length of inflated tubular casing 14 by the shirring means S while reference numeral 16 denotes the last formed pleat in a length of shirred casing 18 which contains a predetermined, measured length of casing.

A typical operation of the apparatus of the invention will now be described and will be more readily understood when considered with the accompanying drawing.

With reference first to FIG. 1, air is admitted from a source of supply (not shown) through the bore 20 of hollow mandrel 12 by means of flexible conduits 24 and clamps C and K having ports mating with the hollow mandrel 12.

The drive means 28 (FIG. 2) is started actuating the belts 31 of feed means 30 through drive shaft 33, sheave 38, endless belt 35, sheave 36 and meshing gears 37, 39 respectively mounted on shafts 26 and 28. In this manner, a continuous length of tubular casing 14, such as collagen, is trained over the leading end of hollow mandrel 12 whereupon it is inflated by the air flowing through the bore 20 of the hollow mandrel 12. The continuous length of inflated tubular casing 14 engaged by the feed means 30 is advanced thereby to the shirring means S whereupon the cogged wheels comprising shirring means S grip, pleat and further advance the continuous length of casing 14 (FIG. 1).

As has been described hereinabove, the feed means 30 is connected to gear box 64 (FIG. 2) by means of sheave 34 which is mounted on the same shaft 26 as is meshing gear 37, endless belt 78, sheave 76 and input shaft 66 thereby providing the means by which a continuous length of casing 14 being advanced by the feed means 30 to the shirring means S is determined and measured. Hence, by selecting appropriate gears for gear box 64, the output shaft 68 of gear box 64 and cam 50 mounted on shaft 52 can be caused to rotate at a given rate by means of endless belt 74 trained about sheaves 70 and 72. Consequently, actuation of the indicators 40, 40' can be readily regulated and controlled.

For example, if it is desired to obtain shirred casing sticks containing 30 feet of tubular casing, indicators 40 and 40' can each be actuated to be indexed by means of cam 50 and three-way air valves 54, 54' as each successive 30 foot length of continuous tubular casing 14 is advanced by the feed means 30 to be shirred by the shirring means S.

As shown in FIG. 2, three-way air valve 54' is pressurized through air line 62' when cam 50 releases spool 56' to ride out of three-way air valve 54' and mate with an intake port in three-way air valve 54', admitting air into spring return air cylinder 46' carriage 42' thereby rotating and indexing the end of indicator 40' in a continuous length of shirred casing 18.

The tapered ends of indicators 40 and 40' are indexed at the last formed pleat 16 of a predetermined, measured length of continuously shirred casing 18 as the last shirred pleat 16 emerges from the locus 17 of the shirring means S, (FIG. 3). Preferably, indicators 40 and 40' are indexed at a point about three-eighths of an inch from the center of the discharge side of the shirring means S.

By adjusting either the length of the indicators and/or the arc through which they are rotated, the tapered ends of the indicators can be caused to engage a continuous length of shirred casing 18 adjacent the last formed pleat 16 thereof so that the indicators are firmly and securely positioned in the continuous length of shirred casing 18 at this point.

As the continuous length of inflated casing 14 continues to be advanced and shirred, indicator 40', in secure engagement at the last shirred pleat 16 of the predetermined, measured length of shirred casing 18, is also freely advanced along with and at the same rate as the shirred casing 18 by means of slide carriage 42' sliding along splined guide rod 44', as is shown in FIG. 1.

As has been described hereinabove and as is shown in FIGS. 1 and 3, the indicators 40, 40' are indexed in a predetermined, measured length of shirred casing 18 aft of the shirring means S but prior to the time the shirred casing 18 is advanced through the belts 33 comprising the holdback means 32 to be compacted thereby. Since the holdback means 32, in a preferred embodiment of this invention, comprises a pair of rotatably driven belts 33, a passage is formed between belts 33 through which the indexed indicators 40, 40' can freely pass as the shirred casing 18 is being advanced through and compacted by belts 33 without interfering with or disturbing the thusly indexed indicators 40, 40'.

As indicator 40' is being thusly freely advanced along with a predetermined, measured length of shirred casing 18, the previously predetermined, measured length of shirred casing 18 previously indicated by indicator 40, is severed manually, or by any other means well known in the art at the point where indicator 40 has been indexed and indicator 40 can then be disengaged. The severed, predetermined measured length of shirred casing 19 (FIG. 1) can now be advanced manually along hollow mandrel 12 to be subsequently compressed to obtain a shirred casing stick.

As shown in FIG. 2, indicator 40 is disengaged when spring return air cylinder 46 is exhausted through air line 61 thereby causing slide carriage 42, splined guide rod 44 and crank arm 48 to counterrotate away from the continuous length of shirred casing 18. Spring return air cylinder 46 is exhausted through air line 61 when cam 50 engages roller 58 of spool 56 forcing spool 56 into three-way air valve 54 to mate with an exhaust port in three-way air valve 54. Indicator 40 is then manually repositioned adjacent the locus 17 of the shirring means S to be indexed at the last formed pleat 16 of the next, successive, predetermined, measured length of shirred casing 18 (FIGS. 1 and 3). This occurs when cam 50 releases spool 56 from three-way air valve 54 thereby pressurizing three-way air valve 54 which, in turn, pressurizes spring return air cylinder 46 through air line 61 so that indicator 40 is rotated to be indexed in the next successive, predetermined, measured length of shirred casing 18 in the same manner as has been described hereinabove with regard to indicator 40'.

The same procedure is followed for returning, repositioning and disengaging indicator 40', which is now in advance of indicator 40, and for severing the predetermined length of shirred casing 18 denoted by indicator 40' as has been described hereinabove with regard to indicator 40.

Successively returning and repositioning indicators 40 and 40' adjacent the locus 17 of the shirring means S (FIG. 3) can be accomplished manually or by providing air cylinders, pneumatic-electrical switches and connecting lines to activate slide carriages 42 and 42' and return them along their respective splined guide rods 44 and 44' to their starting points. Other means such a pneumatic, electrical or hydraulic systems or combinations of such systems can be provided by means and methods well known to those skilled in the art to successively return and reposition indicators 40 and 40' to their respective starting points. For example, one means which has been found to be effective for successively returning indicators 40, 40' to their respective starting points has been accomplished by positioning splined guide rods 44, 44' at a slight angle of about 5° with respect to a horizontally aligned mandrel 12 so that indicators 40 and 40' ride freely back to their starting points on splined guide rods 44 and 44' under the force of gravity.

When two indicators are employed, such as has been described hereinabove, cam 50 should be caused to rotate one-half a revolution for each predetermined, measured length of casing. When only one indicator is employed, cam 50 should be caused to rotate at twice the speed; that is, one revolution for each predetermined, measured length of casing. Hence, the speed at which cam 50 is caused to rotate will be dependent upon the number of indicators desired or required to be employed since more than two indicators can readily be utilized, and will also be dependent upon the predetermined, measured lengths of casing desired or required to be obtained.

It should also be noted that cam 50 should be fabricated so that its rise will remain in engagement with the spools for a time sufficient for the indicators to be disengaged from the continuous length of shirred casing and returned to their starting positions to be indexed.

While the invention has been described with particular reference to tubular collagen casing, it should be understood that this has been merely one means of illustrating and exemplifying the invention and that the invention is not to be construed as being limited thereto. As has been described hereinabove, the invention is also applicable to casings obtained from other materials such as cellulose, regenerated cellulose, polyolefins, starches, alginates and the like.

Hence, although the invention has been described with particularity and in some detail it should be understood that changes, modifications and alterations can be made therein, in addition to those suggested and illustrated hereinabove, without departing from the scope and spirit of the invention.

What I claim is:

1. An apparatus for accurately indicating predetermined, measured, equal lengths of tubular casing to be contained in shirred casing sticks comprising in combination;
   a. a supported hollow mandrel having shirring means mounted about a portion thereof;
   b. means for advancing a continuous length of tubular casing onto said mandrel and through said shirring means;
   c. an indicator slidably mounted on a guide rod positioned spacedly adjacent to and extending parallel with the longitudinal axis of said hollow mandrel;
   d. means for indexing said indicator at a set point on a portion of the advancing casing emerging from said shirring means denoting a predetermined length of casing having advanced to and through said shirring means;
   e. means for advancing said casing from said shirring means over said mandrel with said indicator indexed thereon and freely advancing therewith; and
   f. means for disengaging said indicator from said casing after a subsequent portion of a predetermined length of casing emerges from said shirring means.

2. The apparatus of claim 1 wherein the set point at which indicator is indexed in the shirred casing is at the last formed pleat in each successive predetermined, measured length of shirred casing.

3. The apparatus of claim 1 wherein the set point to which the indicator is indexed is adjacent the locus where the continuous length of tubular casing emerges from the shirring means.

4. The apparatus of claim 1 wherein at least two indicators are provided to be successively indexed at the set point on successive equal lengths of casing emerging from the shirring means.

5. The apparatus of claim 1 which includes means for compacting said advancing shirred with said indicator indexed thereon and freely advancing therewith.

6. The apparatus of claim 1 wherein said indicator is slidably mounted on a rotatable, splined guide rod.

7. A method for obtaining shirred casing sticks which contain predetermined, measured equal lengths of tubular casing, said method including the steps of:
   a. continuously advancing a continuous length of tubular casing about a hollow mandrel and through a shirring passage;
   b. at a set point where the casing emerges from said shirring passage indexing an indicator on the advancing tubular casing after a predetermined length of casing emerges from the shirring passage;
   c. continuously advancing said continuous length of tubular casing from said shirring passage and over said mandrel with said indexed indicator freely advancing concurrently with the casing until a subsequent predetermined length of shirred casing has advanced through said shirring passage;
   d. disengaging said indicator from said shirred casing and returning said indicator to set point at the exit of said shirring passage; and
   e. indexing said indicator on a successive section of casing emerging from said shirring passage such that a predetermined, measured length of advancing shirred casing is indicated.

8. The method of claim 7 wherein the point at which the indicator is indexed on the tubular casing emerging from the shirring passage is at the last formed pleat in each successive, predetermined, measured length of shirred casing.

9. The method of claim 7 wherein the tubular casing is collagen.

10. The method of claim 7 which includes the step of severing the advancing shirred casing at the point where the indicator is indexed before disengaging said indexed indicator from said shirred casing.